United States Patent [19]

Glownia et al.

[11] Patent Number: 4,529,944
[45] Date of Patent: Jul. 16, 1985

[54] RESONANTLY ENHANCED METHOD FOR GENERATION OF TUNABLE, COHERENT VACUUM ULTRAVIOLET RADIATION

[75] Inventors: James H. Glownia; Robert K. Sander, both of Los Alamos, N. Mex.

[73] Assignee: The United States of America as represented by the Department of Energy, Washington, D.C.

[21] Appl. No.: 393,251

[22] Filed: Jun. 29, 1982

[51] Int. Cl.$^3$ .......................... H03F 7/00; H01S 3/00
[52] U.S. Cl. ................................... 330/4.3; 350/359; 307/428
[58] Field of Search ............... 330/4.3, 4.5; 350/359; 307/428, 425

[56] References Cited

U.S. PATENT DOCUMENTS 4,107,544  8/1978  Kildal et al. .......................... 372/22

OTHER PUBLICATIONS

"Three-Photon Excitation of Xenon and Carbon Monoxide", by F. H. M. Faisal, R. Wallenstein and H. Zacharias, Phys. Rev. Letters 39, 1138, (1977).
"Four-Wave Sum Mixing (130–180 nm) in Molecular Vapors", by K. K. Innes, B. P. Stoicheff and S. C. Wallace, Appl. Phys. Letters 29, 715, (1976).
"Nonlinear Laser Spectroscopy in Nitric Oxide Studied Through VUV Harmonic Generation", by S. C. Wallace and K. K. Innes, J. Chem. Phys., 72, 4805, (1980).
"Third-Harmonic Generation Using an Ultrahigh-Spectral Brightness ArF* Source", by H. Pummer, T. Srinivasan, H. Egger, K. Boyer, T. S. Luk, and C. K. Rhodes, Optics Letters 7, 93, (1982).
"Resonantly Enhanced Multiphoton Ionization and Third-Harmonic Generation in Xenon Gas", by J. C. Miller, R. N. Compton, M. G. Payne and W. W. Garrett, Phys. Rev. Letters 45, 114, (1980).
"Resonantly Enhanced Vacuum Ultraviolet Generation and Multiphoton Ionization in Carbon Monoxide Gas", by J. H. Glownia and R. K. Sander, Appl. Phys. Letters 40, 648, (1982).

Primary Examiner—Nelson Moskowitz
Attorney, Agent, or Firm—Samuel M. Freund; Paul D. Gaetjens; Judson R. Hightower

[57] ABSTRACT

Carbon Monoxide vapor is used to generate coherent, tunable vacuum ultraviolet radiation by third-harmonic generation using a single tunable dye laser. The presence of a nearby electronic level resonantly enhances the nonlinear susceptibility of this molecule allowing efficient generation of the vuv light at modest pump laser intensities, thereby reducing the importance of a six-photon multiple-photon ionization process which is also resonantly enhanced by the same electronic level but to higher order. By choosing the pump radiation wavelength to be of shorter wavelength than individual vibronic levels used to extend tunability stepwise from 154.4 to 124.6 nm, and the intensity to be low enough, multiple-photon ionization can be eliminated. Excitation spectra of the third-harmonic emission output exhibit shifts to shorter wavelength and broadening with increasing CO pressure due to phase matching effects. Increasing the carbon monoxide pressure, therefore, allows the substantial filling in of gaps arising from the stepwise tuning thereby providing almost continuous tunability over the quoted range of wavelength emitted.

5 Claims, 5 Drawing Figures

RESONANTLY ENHANCED METHOD FOR GENERATION OF TUNABLE, COHERENT VACUUM ULTRAVIOLET RADIATION

This invention is the result of a contract with the Department of Energy (Contract No. W-7405-ENG-36).

BACKGROUND OF THE INVENTION

The present invention relates generally to generation of vacuum ultraviolet radiation, and more particularly to resonantly enhanced generation of wavelength tunable, coherent vacuum ultraviolet radiation utilizing thirdharmonic generation in gaseous carbon monoxide.

Interest in relatively intense, coherent, tunable light sources in the vacuum ultraviolet region of the electromagnetic spectrum has increased in recent years because of the growth of spectroscopic investigations in this wavelength region; e.g., using synchrotron radiation sources, and the need for a diagnostic procedure for hydrogen in fusion research, to name two reasons. The method of the instant invention provides wavelength tunable coherent radiation in the region of the ultraviolet between 154.4 and 124.6 nm by means of third-harmonic generation in carbon monoxide resonantly enhanced by the nearby presence of the $A^1\pi$ state. That is intense, pulsed visible radiation in the range 463.2 to 373.8 nm is generated by a tunable dye laser and focused into a gaseous sample of carbon monoxide, and due to the proximity of a series of vibronic energy levels the third order nonlinear susceptibility of carbon monoxide is rendered large, thereby allowing strong four-wave sum mixing to occur with the emission of coherent vacuum ultraviolet radiation at one-third the wavelength of the incident visible or near ultraviolet radiation. By making use of the multitude of vibration-rotation states within the vibronic manifold, by varying the carbon monoxide pressure, and by using isotopic carbon monoxide $^{13}CO$ or $C^{18}O$ the range from 154.4 to 124.6 nm can be nearly continuously covered. The major problem when evaluating multiple-photon harmonic generation schemes in materials is that very high pump laser intensities are generally necessary to achieve significant harmonic output. Such substantial laser electric fields are sufficient to dissociate or ionize the nonlinear medium. However, if a real molecular energy level exists which is closely matched to some multiple of the pump laser frequency (in the instant case, a factor of 3) a resonant enhancement of the third-order nonlinear susceptibility occurs which significantly increases the magnitude of this quantity so that the experimentally observed third-harmonic signal is increased by many orders of magnitude. That is, the intensity of the generated third-harmonic signal is proportional to the square of the magnitude of the third-order nonlinear susceptibility, so if this quantity is made large because of the near coincidence of a nearby molecular energy level with which the pump photons can interact, the coherent, tunable generated radiation can be made quite intense. The purpose of this resonant enhancement is not to induce actual transitions (although these will occur to a small extent), but to maximize the interaction between the pump laser photons and the nonlinear medium, here carbon monoxide. In other words, there is a nonlinear interaction between the pump, radiation and the carbon monoxide without significant absorption, which is a linear process. This concept will be an important distinguishing feature of the instant invention over the first of the five relevant references discussed below.

1. "Three-Photon Excitation of Xenon and Carbon Monoxide," by F. H. M. Faisal, R. Wallenstein, and H. Zacharias, Phys. Rev. Letters, 39, 1138 (1977), describes the excitation through the P, O, and R branches of the (2-0) band of CO in the fourth positive system ($A^1\pi \leftarrow X^1\Sigma^{30}$). This $A^1\pi$ state is the energy level which is used in the instant invention to resonantly enhance the third-harmonic generation. However, the authors report only the observation of fluorescence orthogonal to the pump laser beam. In addition, they find that this fluorescence disappears as the CO pressure is increased. These two facts strongly teach away from our method. First, the coherent third-harmonic radiation taught by the instant invention is not isotropic; that is, it is not radiated in all directions so that it would not be detected orthogonally to the pump laser beam. Moreover, the fluorescence radiation consists of much spectroscopic detail whereas, our coherent radiation is simply a single, narrow feature. Finally, the disappearance of the fluorescence with pressure is most likely due to the increased efficiency of third-harmonic generation which competes with the actual level pumping by three-photon absorption. At increased pressure, the conditions required for harmonic generation are improved due to a higher nonlinear susceptibility of the CO medium.

2. "Four-Wave Sum Mixing (130–180 nm) in Molecular Vapors," by K. K. Innes, B. P. Stoicheff, and Stephen C. Wallace, Appl. Phys. Letters, 29, 715 (1976), discusses the generation of coherent radiation in gaseous samples of nitric oxide, bromine and benzene by means of resonantly enhanced four-wave mixing. The authors thereon merely mention that bromine provides 177 nm radiation, while benzene provides radiation at 163 nm. Nothing was related concerning the energy level schemes involved except that these gases yield lower harmonic conversion efficiencies than NO which was discussed in much greater detail. This reference is appropriately combined with reference 3 to be elaborated on hereinbelow and wherein two of the three authors investigate harmonic generation in nitric oxide in yet further detail.

3. "Nonlinear Laser Spectroscopy in Nitric Oxide Studied Through VUV Harmonic Generation," by Stephen C. Wallace and K. K. Innes, J. Chem. Phys., 72, 4805 (1980) shows the energy level scheme used for resonantly enhancing third-harmonic generation for nitric oxide. FIG. 1 therein shows that the enhancing level is coincident with the energy reached by two photons, there being no molecular energy level nearby the energy attained by three photons. This article teaches away from the instant invention in three respects. First, again referring to FIG. 1, the only optical mixing scheme proposed which utilizes the presence of an energy level of NO with energy corresponding to 150 to 130 nm ($M^2\Sigma^+$ incorrectly labeled as $M^2\pi$), teaches the use of an intense first frequency of visible radiation such that there is a nearby energy level at the sum frequency for two of these photons, and a second visible frequency photon to span the energy gap between the sum of the two first resonant photons and a second energy level corresponding to vacuum ultraviolet radiation. An intense vuv four-wave mixing signal is observed. Basically, this is a double resonance mixing scheme which gives about 1000 times more output energy than the third-harmonic generation utilizing the single energy level at twice the pump photon energy and a third photon of the same energy to reach the vacuum ultraviolet region of the electromagnetic spectrum, which radiation is detected as a coherent signal. Further, in the conclusions section, the authors mention other molecules for which multiphoton spectra have been obtained ($Br_2$, IBr, $H_2O$ and benzene), but neither give details, nor mention the use of carbon monoxide. Moreover, in this same section, mention is made of the observation of third-harmonic generation in NO without intermediate resonant enhancement. The only other mention of third-harmonic generation is that mentioned hereinabove and utilizes the intermediate level in NO at twice the laser pump frequency. This is a very similar approach to that taken in Ref. 4 discussed hereinbelow. If it were obvious to make use of the clearly available energy level in NO corresponding to vuv emission to significantly enhance this emission, the authors of Refs. 2 and 3 have found three distinct methods of teaching away from the instant invention which teaches the use of such a level, thereby improving the intensity of the emitted radiation orders of magnitude over the methods taught in their above-referenced articles. It is reasonable to expect that at the higher laser intensity required for third-harmonic generation, even resonantly enhanced by a nearby energy level, that the NO would undergo significant destruction through ionization or dissociation in view of its instability relative to CO which was chosen for use in the instant invention because of its great stability and for its appropriate energy level system.

4. In "Third-Harmonic Generation Using An Ultrahigh-Spectral Brightness ArF* Source," by H. Pummer, T. Srinivasan, H. Egger, K. Boyer, T. S. Luk, and C. K. Rhodes, Optics Letters 7, 93 (1982), the authors teach the generation of tunable coherent radiation in the vicinity of 64 nm using third-harmonic generation of the output from an ultrahigh-spectral-brightness ArF* source in various simple gaseous media. The gases which produced observable signals ($H_2$, $D_2$, Ar, Kr, and CO) all have states close to the two-photon energy employed (the CO state involved is actually the same state which enhances the process of the instant invention being approximately equivalent in energy to three of our pump photons), and all are strongly ionized by absorption of the tripled radiation. The use of buffer gases and differentially-pumped chambers is required to minimize this absorption. The method of the instant invention is spared this latter difficulty by the simple fact that the third-harmonic wavelength generated is well below the ionization continuum for CO. The authors of this reference, however, do not mention direct ionization of the non-linear media by the pumping radiation, a problem which can be severe and which solution is taught by our method. This reference, therefore, does not provide any teachings directed toward three-photon harmonic generation in CO with resonant enhancement provided by real energy levels at the energy of the coherently generated photons, nor does it teach one how to overcome the increasingly important (at higher pump energies) ionization of the carbon monoxide gas.

5. The final reference, "Resonantly Enhanced Multiphoton Ionization and Third-Harmonic Generation in Xeonon Gas," by John C. Miller, R. N. Compton, M. G. Payne, and W. W. Garrett, Phys. Rev. Letters, 45, 114 (1980), describes the parallel process of the instant invention for atomic gases. Therein it is noted that the observed multiphoton ionization of the xenon gas nonlinear medium disappears at higher pressures being replaced by intense third-harmonic generation in the forward direction relative to the pump laser. Presumably, at the higher pressures the third-harmonic generation becomes more efficient because of a higher nonlinear susceptibility. No vuv light was detected at right angles to the pump laser either. As mentioned hereinabove in the discussion of Ref. 1, this can be another indication of a strongly phase-matched system. These observations are also found for carbon monoxide in the method of the instant invention. Additionally, we have observed that no multiphoton ionization occurs at any carbon monoxide pressure if the excitation wavelength is adjusted to be to the blue (shorter wavelength) of individual vibronic energy levels of CO. the Miller et al. reference, even when combined with the above-mentioned references, does not teach our invention, however. First, it is not clear that a molecule would stay together (i.e., not ionize or dissociate) at the laser intensities required to generate significant coherent vuv radiation. Remarkably, CO has an about 14 eV ionization potential (significantly higher than the 10 eV known for Xe). This coupled with the resonant enhancement of the nonlinear susceptibility (as in NO) makes CO an ideal candidate to try. Further, it is not obvious that the phase matching in this molecular vapor would be so complete that the ionization process could be virtually eliminated at all pressures by carefully choosing the pump laser wavelength. It is also never possible to make accurate generalizations from atomic properties to molecular ones. Finally, there is no mention of production of coherent, tunable radiation over a wide range of the vuv region in the Miller et al. article. Xenon has only two, three-photon resonant electronic levels in the region of interest ($6s(3/2)J=1$ and $6s'(1/2)J=1$), and although they can be broadened and shifted at higher pressures, the range coverable is but a fraction of that available from CO with its multitude of vibronic levels. Furthermore, these vibronic levels may be shifted in energy by use of a carbon or oxygen isotope in CO as discussed hereinbelow.

Thus, although coherent third-harmonic generation has been observed in References 2–4 cited hereinabove, the resonantly-enhanced process taught by the method of the instant invention for carbon monoxide with its consequently more modest pump laser requirement, its complete elimination of multiple-photon ionization by judicious choice of pump laser wavelength, and its broad range of tunability which are available only from the choice of a molecular vapor nonlinear medium, is not derivable even for one skilled in the art from these references, singly or in combination.

SUMMARY OF THE INVENTION

An object of the method of the instant invention is to provide coherent, tunable ultraviolet radiation in the range from 154.4 to 124.6 nm.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the method of this invention may comprise the steps of first generating tunable, pulsed pump radiation in the visible region of the electromagnetic spectrum between 463.2 and 373.8 nm. This radiation is focused into a gaseous sample of carbon monoxide. Preferably, the carbon monoxide is maintained at pressures between 1 and 500 torr to enable phase matching for a four-wave mixing process over the range from 154.4 to 124.6 nm. The wavelength and intensity of the pump radiation are adjusted to maximize generation of the tunable, coherent third-harmonic ultraviolet radiation arising from the nonlinear interaction of the pump radiation with the carbon monoxide through the resonantly-enhanced third-order susceptibility. This resonant enhancement is enabled by the presence of the plurality of vibronic levels of the A-electronic state of CO. By adjusting the wavelength of the pump radiation to be to the blue of a given vibronic level, the pump intensity can be adjusted to minimize multiple-photon ionization and molecular dissociation processes while allowing the generation of intense, coherent vacuum ultraviolet radiation. The instant third-harmonic generation process allows tunability in 800 $cm^{-1}$ steps about these vibronic levels. Improved phase-matching resulting from increasing the gas pressure further facilitates continuous tuning over the quoted range. It is also preferred that the pump radiation be generated by a frequency-tripled Nd:YAG pumped dye laser. It is finally preferred that the coherent vacuum ultraviolet radiation, which is generated in essentially the same direction as the pump radiation, is filtered to remove the visible pump radiation.

The benefits and advantages of the process of the instant invention are as follows. First, the extensive Franck-Condon envelope of the near-resonant A-vibronic state provides a wide tuning range not available from atomic vapor nonlinear media; e.g., xenon has only two electronic levels in the desired region, while CO has many rotation-vibration levels available from the A-electronic state. Further, unlike NO with its 9.26 eV ionization potential and 6.496 eV dissociation limit, CO has a very high (for a molecule) ionization potential of 14.01 eV, and a high dissociation limit of 11.11 eV. Because of this, processes which compete with third-harmonic generation such as dissociation and ionization are higher order and therefore of less importance in the wavelength region of interest. Finally, because of the resonant A-state, an efficiency of $10^{-6}$ is obtainable for CO, which is considerably greater than the $2 \times 10^{-8}$ obtainable using the two-photon resonant energy level scheme reported for NO.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Reference will now be made in detail to the present preferred embodiment of the invention, an example of which is illustrated in the accompanying drawings.

In accordance with the invention, carbon monoxide vapor is used to generate coherent, tunable vacuum ultraviolet (vuv) radiation by resonantly enhanced third-harmonic generation (THG) using a single tunable dye laser pump source. By the adjustment of the wavelength and intensity of the pump laser, multiple-photon ionization (MPI) can be eliminated. Shifts to higher frequencies and broadening of the third-harmonic emission at higher CO pressures and use of $^{13}CO$ allow nearly continuous tuning over the range 154.4 to 124.6 nm.

Figure 1:
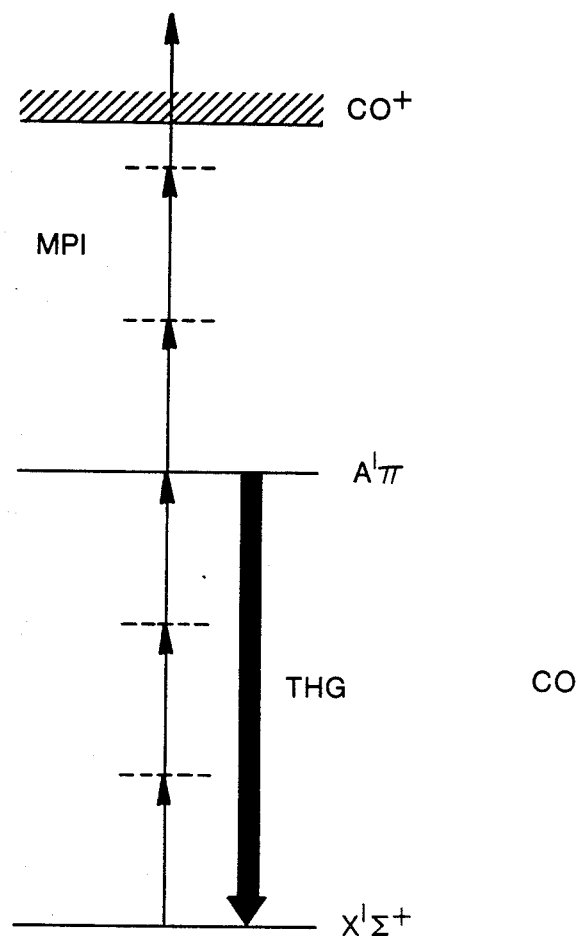
FIG. 1 shows the energy level diagram for the $A^1\pi$ state (fourth positive system) of carbon monoxide relative to the magnitude of the visible pump laser photons and the ionization potential.

In the Figures:

FIG. 1 shows an energy level diagram for CO wherein the approximate relationship between the energy of the pump laser photons and both the enhancing $A^1\pi$ vibronic level and the ionization limit is displayed. To be noticed is the fact that the pump wavelength is chosen such that the $A^1\pi$ vibronic level is nearly resonant (of equal energy) with the energy of the sum of three photons (assuming we are starting with molecules near the ground vibrational state of the $X^1\Sigma^+$ electronic level (ground electronic state)). The $A^1\pi$ state consists of numerous vibration-rotation sublevels (not shown) which permits the pump photons to be in stepwise resonance with the carbon monoxide. As will be discussed hereinbelow, pressure-induced shifts and spectral broadening insure continuous tuning between the vibronic levels while maintaining the third-harmonic generation efficiency. Further, by increasing the CO pressure, one can improve phase matching, critical for such four-wave mixing processes, since the index of refraction of a gas changes with gas density.

The importance of the near resonant level arises from the nature of the harmonic generation process. In the process of the instant invention, where third harmonic generation is used to derive difficult-to-obtain intense coherent and tunable vuv radiation from readily available visible photons, the interaction between the pump radiation and the CO occurs through the third-order nonlinear susceptibility, since this is the only interaction which is favored. That is, the presence of the $A^1\pi$ level allows the predominant interaction to be a four-wave mixing process (three pump photons are added and a fourth (the third-harmonic of the pump photons) emerges in the direction of the original three), any linear absorption processes being of minor consequence because CO does not absorb visible radiation directly. Moreover, the $A^1\pi$ level population is not significantly changed by the third-harmonic generation either as is evidenced by the absence of fluorescence emission which would occur isotropically, unlike the desired coherent emission.

Figure 2:
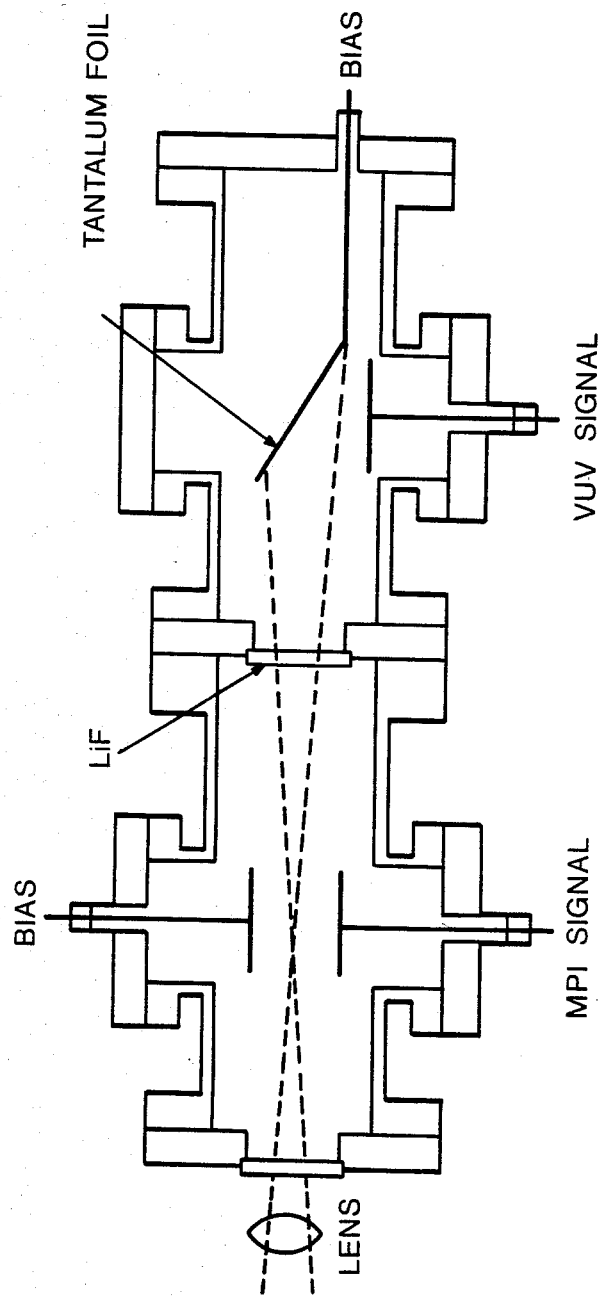
FIG. 2 shows the apparatus used to generate the tunable coherent vacuum ultraviolet radiation and measure the competing multiple-photon ionization process.

FIG. 2 is a schematic of the apparatus used to demonstrate and optimize the method of the instant invention. It consists of a four-way cross connected to a pumping system. It is very much like the one displayed in FIG. 1 of Reference 4 cited hereinabove. The output of a frequency-tripled Nd:YAG laser pumped Coumarin 440 dye laser is focused by either a 7.5 or 10 cm focal length lens to a waist calculated to be about 10 $\mu$m. The laser flux in the focal volume is on the order of $10^{29}$ to $10^{30}$ photons·cm$^{-2}$·S$^{-1}$. Photoelectrons resulting from any MPI occurring are monitored with a flat-plate platinum collector. Amplification occurs by an electron avalanche in the CO gas arising from a negative bias of 200-300 V placed on a second platinum plate situated parallel to the collector. Any coherent vacuum ultraviolet light produced by the interaction of the focused pump radiation with the CO passes through a lithium fluoride (LiF) window and a dielectric filter to reject the pump light and transmit the vuv light into a second chamber filled with 0.5 torr of argon gas. This second chamber is differentially pumped and contains a sheet of negatively biased tantalum foil. The foil, which is angled to enhance its yield of photoelectrons, has a high (4.2 eV) work function which means that it will not respond to any remaining incident visible pump radiation which may have been transmitted through the filter; indeed, little background was observed from this source of incident photons. Ejected photoelectrons are collected with another flat-plate platinum electrode. The argon gas provides some amplification of the photoelectrons. The electron signals due to MPI and THG are amplified and integrated using a boxcar averager before being recorded on an x-y plotter. Spectral grade commercial CO is passed through a 77 K trap before use to remove any iron carbonyl compounds present since these give rise to large MPI signals which interfere with those arising from the CO, and may absorb either the pump light or the vacuum uv light.

Figure 3:
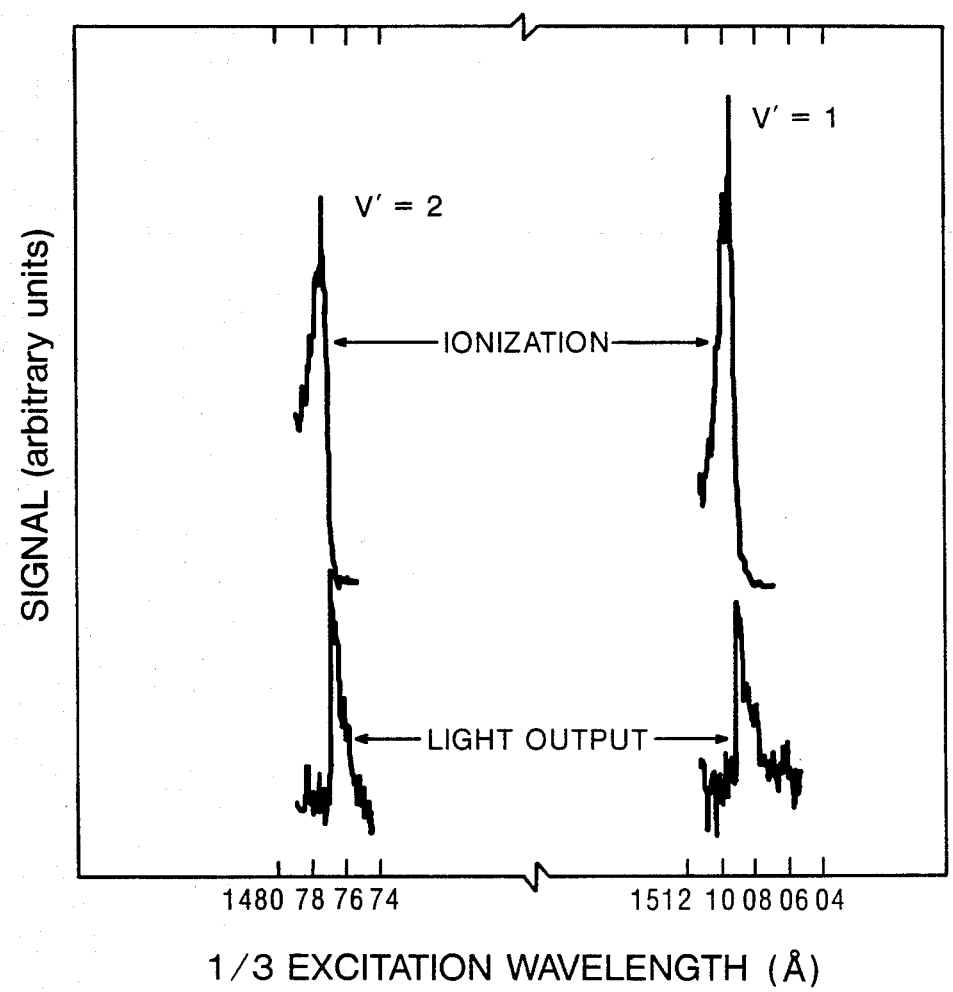
FIG. 3 shows the multiple-photon ionization and third-harmonic generation excitation spectra for the $v'=1$ and $v'=2$ vibronic levels of the A-state at a CO pressure of 10 torr.

FIG. 3 shows the MPI and THG excitation spectra for the $v'=1$ and $v'=2$ vibronic levels of the A-state of CO at a pressure of 10 torr. The ionization signals are due to three-photon $A^1\pi$ resonantly enhanced six-photon MPI. At slower pump laser wavelength scan speeds, MPI signals show the expected rotational structure. Most importantly, to be observed is that to the blue (shorter wavelength) of the R-head or beginning of the series (the so-called R ($\Delta J = -1$) or Q($\Delta J = 0$) transitions for this molecule, J being the rotational quantum number, and $\Delta J$ being the change therein), all MPI ceases and the THG process takes over. It is this feature, also found for Xe in Reference 4 cited hereinabove, that enables tunable, coherent, vacuum ultraviolet radiation to be produced by the method of the instant invention without serious loss of the carbon monoxide nonlinear medium to ionization and subsequent dissociation processes. Vacuum ultraviolet radiation is detected only in the forward direction relative to the pump laser light. As mentioned hereinabove, this means that little, if any, population changes are occurring in the $A^1\pi$ vibronic level; such changes would be evidenced by isotropic fluorescence with its characteristic rotational-vibrational structure. Although the excitation spectra show rotational structure, the emitted third-harmonic radiation mirrors the sharp linewidth of the pump laser.

Figure 4:
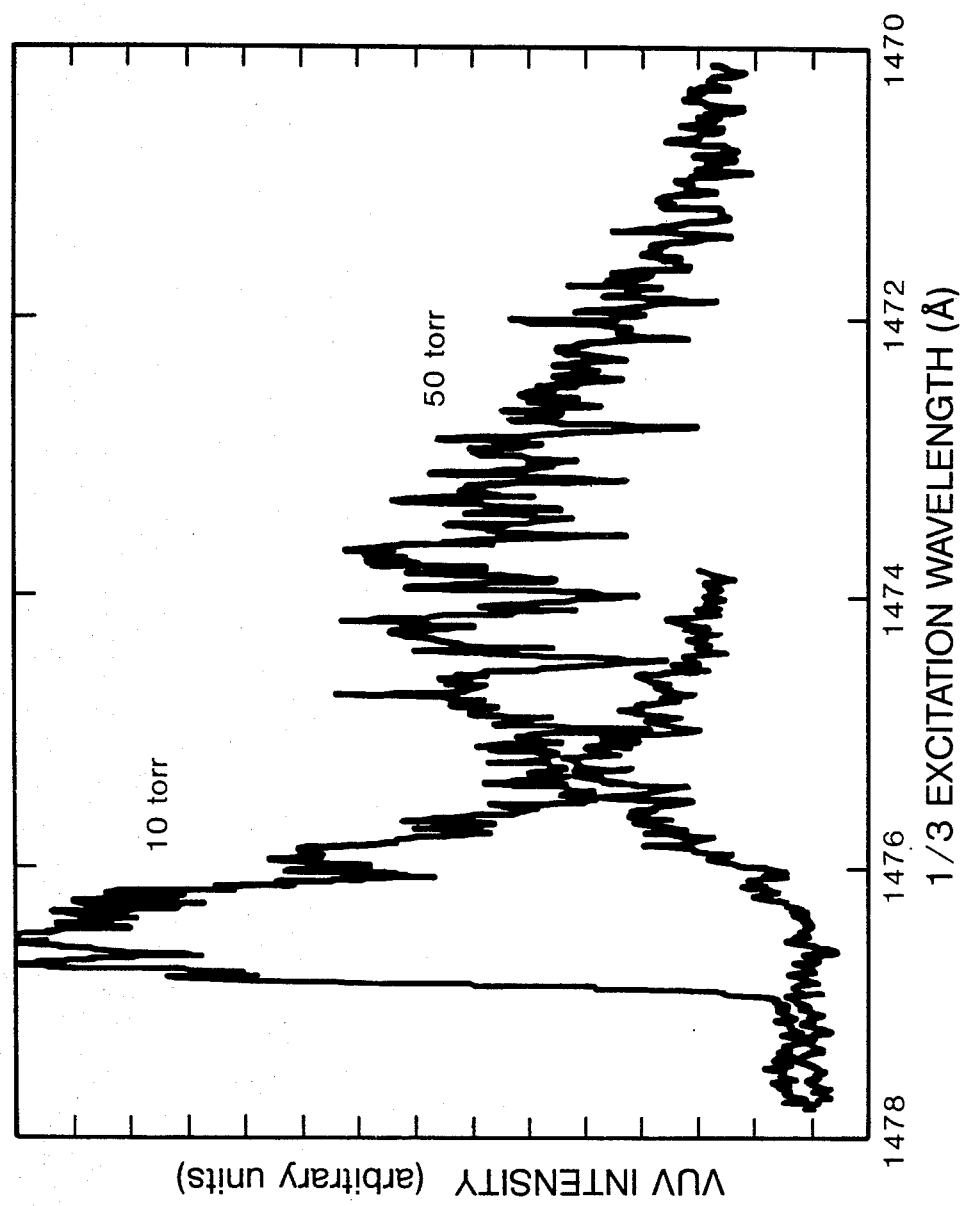
FIG. 4 shows the blue shifts and increasing bandwidth of the excitation spectrum as the pressure of the CO gas is increased.

The excitation spectrum shown in FIG. 4 exhibits increasing shifts and bandwidths with increasing CO pressure. The obvious sharp dips in the two traces are caused by weak absorption of some CO molecules to high rotational levels of various triplet states, confirming identification of the observed vuv light as tunable, monochromatic third-harmonic emission. In applications where these absorption lines would be troublesome, our calculations show they can be removed by using low temperature CO gas (77 K) in the THG cell. The blue shifts and broadening of the vuv light with pressure are consistent with the wave vector phase matching requirements. It is known from prior art that the optimum phase mismatch, $\Delta K$ (where $\Delta K = 6\pi(N_p - N_{TH})/\lambda_p$, $\lambda_p$ is the dye laser pump wavelength, and $N_p$ and $N_{TH}$ are the refractive indices at $\lambda_p$ and $\lambda_p/3$ respectively), for focused beams has a small negative value. In CO, the generated vuv frequency is higher than that of the vibronic levels of the A-state making a negative $\Delta K$ possible.

Measurements of the maximum third-harmonic output of CO and Xe show that they are comparable. Since the efficiency for THG depends on the square of the pump laser flux, increased THG efficiency should be possible by raising this flux to the limit of dielectric breakdown for the nonlinear medium, which limit is observed to be much higher for CO than Xe.

Figure 5:
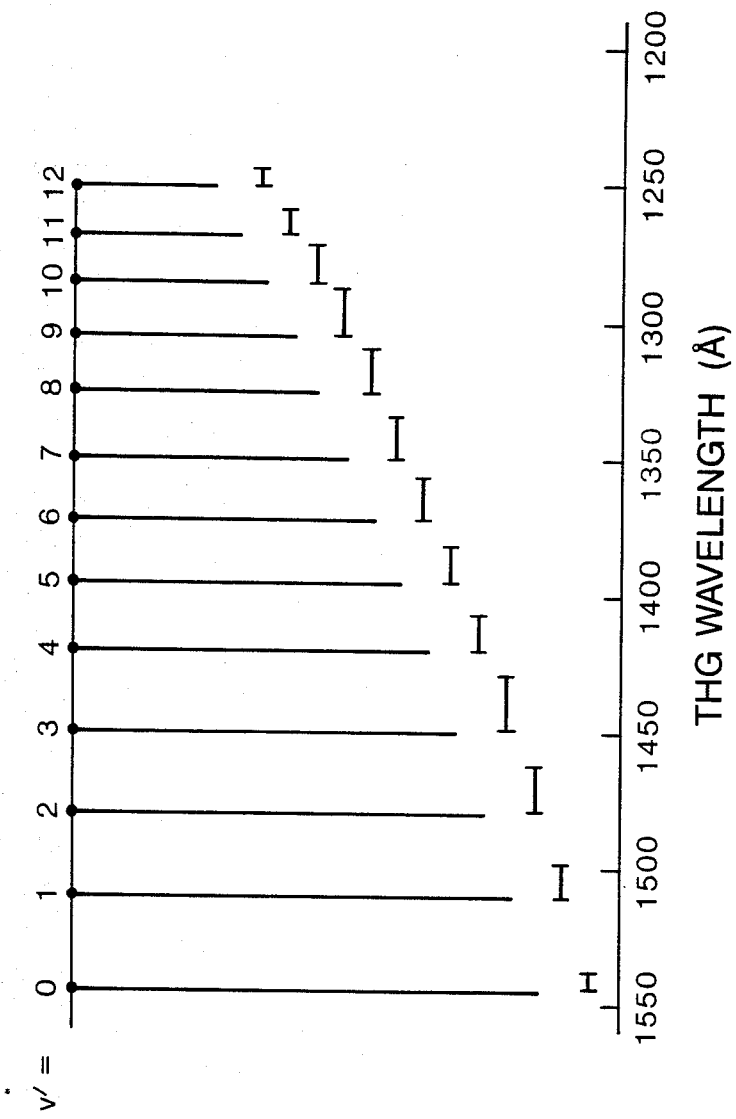
FIG. 5 shows the region in which tunability is observed for $^{12}CO$ and for which calculations using well-known formulas for isotope shifts show should be observable for $^{13}CO$.

Finally, the quoted stepwise tuning range for vuv generation of between 154.4 and 124.6 nm will be possible by accessing higher $A^1\pi$ vibronic levels up to the predissociation limit for this state as is shown in FIG. 5. Nearly continuous tuning is rendered possible by utilizing the pressure effect on the phase matching condition which amounts to a tunability of about 800 cm$^{-1}$ from each band head as discussed hereinabove. Pressures in the range from 5 to 350 torr of carbon monoxide were used to give this tunability. The A-state vibrational level is denoted by v'. At longer wavelengths, the tuning range to the blue of each bandhead may be seen. At shorter wavelengths two effects occur: the tuning range around each bandhead is experimentally observed to increase, and use of $^{13}$CO shifts the bandhead. The isotope shift in the bandhead wavelength between $^{12}$CO and $^{13}$CO is proportional to v'. Therefore, the gaps are nearly filled in by using either $^{12}$CO or $^{13}$CO. We have used $^{13}$CO for THG at v'=2 and corroborated the well-known theory of isotope shifts. The data for FIG. 5 was obtained using THG in $^{12}$CO and the theoretical isotope shifts of $^{13}$CO.

In summary, CO vapor can be used to generate intense, coherent, continuously and broadly tunable vuv radiation by third-harmonic processes using a single, tunable dye laser. The normally troublesome multiple-photon ionization which occurs when molecules are subjected to intense electromagnetic fields is eliminated by careful choice of pump laser wavelength and intensity. The high efficiency of $10^{-6}$ is obtained because of the presence of a nearby energy level in CO which resonantly enhances the four-wave mixing process.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for generating tunable, coherent ultraviolet radiation in the range from 154.4 to 124.6 nm, which comprises the steps of:
    (a) generation tunable, pulsed radiation in the visible region of the electromagnetic spectrum between 463.2 and 373.8 nm;
    (b) focusing said pulsed visible radiation;
    (c) directing said focused visible radiation to fall incident on a gaseous sample of carbon monoxide;
    (d) adjusting the intensity and wavelength of said focused visible radiation to maximize generation of the tunable, coherent ultraviolet radiation arising from third-harmonic creation from said focused visible radiation interacting with said carbon monoxide resonantly enhanced by the nearby presence of the A-vibronic state thereof, while multiple-photon dissociation and ionization of said carbon monoxide are minimized; and
    (e) adjusting the pulsed visible radiation to be shorter in wavelength than three times the wavelength of a particular vibronic transition of said A-vibronic state which is used to enhance said third-harmonic creation at a given ultraviolet wavelength in order that said ionization of said carbon monoxide be reduced to a substantially zero value, thereby rendering said third-harmonic creation tunable in approximately 800 $cm^{-1}$ steps substantially covering the range from 154.4 to 124.6 nm; and
    (f) filtering the generated ultraviolet radiation in the direction of travel of said focused visible radiation to remove said focused visible radiation not absorbed by said carbon monoxide.

2. The method as described in claim 1, wherein said gaseous sample of carbon monoxide is pressurized to substantially 1 to 500 torr in order to insure overlap of said 800 $cm^{-1}$ tuning steps thereby obtaining substantially continuously tunable coherent ultraviolet radiation between 154.4 and 124.6 nm.

3. The method as described in claim 2, wherein said intensity of focused visible radiation is approximately $10^{29}$ to $10^{30}$ photons/$cm^2$.s in the focal volume.

4. The method as described in claim 3, wherein said carbon monoxide is enriched in isotopes selected from the group consisting of $^{13}C$, $^{18}O$, and $^{17}O$, and pressurized, in order to more fully cover the range of generation of coherent, tunable ultraviolet radiation.

5. The method as described in claim 4, wherein said pulsed, tunable visible radiation generating step is achieved using apparatus which includes a frequency-tripled Nd:YAG laser pumped dye laser.

* * * * *